G. H. F. HOLY.
LOCOMOTIVE.
APPLICATION FILED MAR. 2, 1917.
1,351,038.
Patented Aug. 31, 1920.
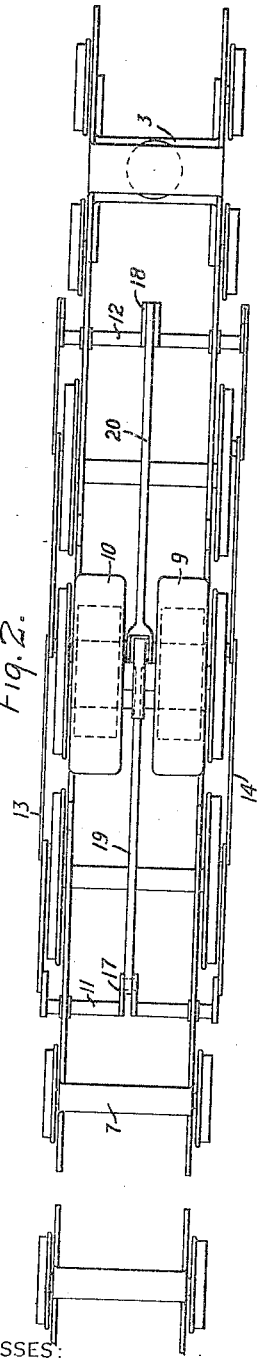
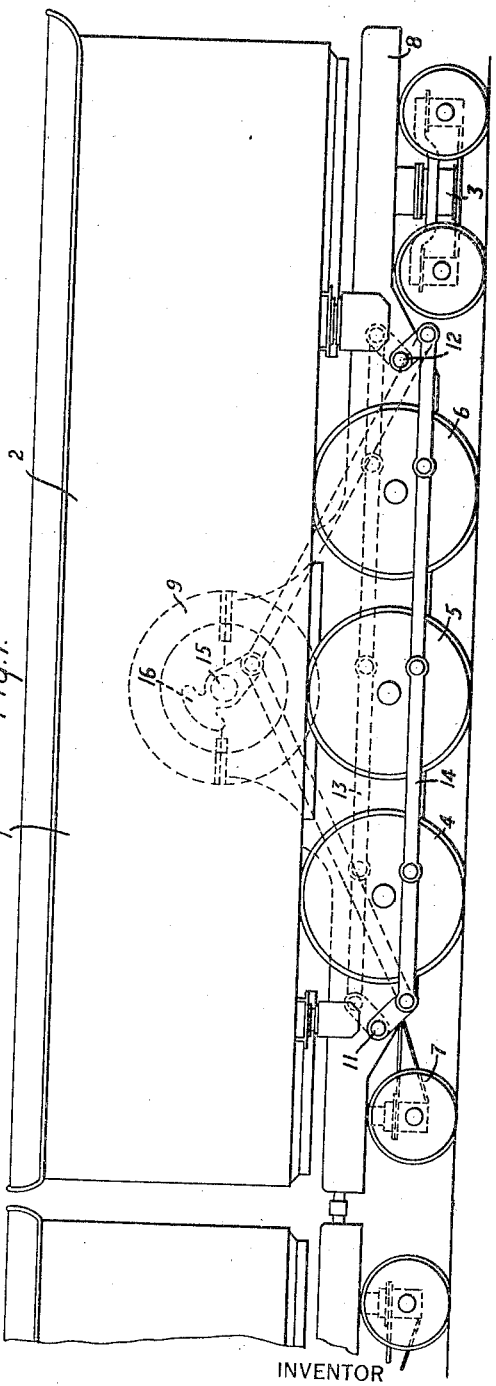
WITNESSES:
Fred. A. Lind.
Wayne B. Wells.
INVENTOR
George H. F. Holy
BY
Wesley G. Carr
ATTORNEY

UNITED STATES PATENT OFFICE.

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

LOCOMOTIVE.

1,351,038.

Specification of Letters Patent.   Patented Aug. 31, 1920.

Application filed March 2, 1917.   Serial No. 151,946.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Locomotives, of which the following is a specification.

My invention relates to locomotives and particularly to electric locomotives which are provided with rod connecting means between the propelling motors and the driving wheels thereof.

One object of my invention is to provide a locomotive having means comprising side rods, jack shafts and motor rods for transmitting the driving effort of the motors to the driving wheels, which are so disposed relative to each other as to permit the motor torque to be delivered to the jack shafts at a point where a minimum displacement of the jack shafts occurs and to permit the driving effort of the motors to be divided equally between the various driving wheels.

Another object of my invention is to provide a locomotive which shall have the propelling motors disposed above the driving wheels in order to obtain a high center of gravity for the locomotive, and have the motor bearings so disposed as to more evenly divide between them the stresses and strains to which the same are subjected.

Another object of my invention is to provide a locomotive of the above indicated character which shall be provided with two motors having the armatures thereof tandem mounted on one shaft and with two motor rods which are disposed in a vertical central plane of the locomotive for transmitting the driving effort of the motors to the driving wheels.

Heretofore, the locomotives of the side-rod type have been provided with jack shafts and with motor rods that are disposed in a plane outside of the plane of the driving wheels so that the jack shaft and the rods connected thereto are subjected to considerable torsional stress at each reversal of the side rods by reason of the distance from the middle of the jack shaft, where the minimum displacement thereof occurs, that the force of the propelling motor is applied. Moreover, when the motor rods are disposed outside the plane of the driving wheels, the driving effort of the motors is unequally distributed to the driving wheels.

However, in a locomotive constructed in accordance with my invention, the propelling motors are connected to the jack shaft by means of motor rods which are disposed in a central vertical plane of the locomotive so that the same are connected to the jack shaft at a point where a minimum displacement thereof occurs, and an equal division of the driving effort of the motors to the various driving wheels is insured.

In the accompanying drawing, Figure 1 is a side elevational view of a locomotive constructed in accordance with my invention, and Fig. 2 is a plan view of the running gear of the locomotive illustrated in Fig. 1.

Referring to the accompanying drawing, a locomotive 1 is provided with a cab 2, a pivotal truck 3, three pairs of driving wheels 4, 5 and 6, an auxiliary radial truck 7 and side frames 8. Two motors 9 and 10 are mounted upon the side frames above the pairs of driving wheels 4, 5 and 6.

Two jack shafts 11 and 12 are mounted on the side frames adjacent to the driving wheels 4, 5 and 6, and are connected to the various driving wheels by means of side rods 13 and 14. The motors 9 and 10 are provided with armatures which are tandem mounted upon a shaft 15 that is provided with a crank 16 intermediate the two motors.

The jack shafts 11 and 12, respectively, are provided with cranks 17 and 18 intermediate the ends thereof, which are connected to the motor crank 16 by means of the motor rods 19 and 20.

Thus, the two motor rods 19 and 20 are located in a central vertical plane of the locomotive, and are connected to the jack shafts intermediate the ends thereof and at points where a minimum deflection of the shafts is effected by means of the reversals of the side rods. Moreover, the shaft 15 is provided with bearings adjacent to the crank 16 in order to add rigidity and strength to the motor structure.

In the locomotive illustrated in the accompanying drawing, the two side rods 13 and 14 are connected to the jack shaft 11 and 12 in quartered relation and the two cranks 17 and 18 are alined with the cranks connected to the side rod 14, but it is to be understood that the side rods and the motor rods may be connected in various relations to the jack shafts.

Modifications in the structure and arrangement and location of parts may be made within the spirit and scope of my invention and such modifications are intended to be covered by the appended claims.

I claim as my invention:

1. In an electric locomotive, the combination with a plurality of driving wheels and electric motors disposed above the driving wheels, of means for transmitting the driving effort of the motors to the driving wheels, said means comprising inclined motor rods disposed in a central vertical plane of the locomotive.

2. In an electric locomotive, the combination with an electric motor and a plurality of driving wheels, of means for transmitting the driving effort of the motor to the driving wheels, said means comprising a plurality of motor rods disposed in a central vertical plane of the locomotive.

3. In a locomotive, the combination with a plurality of driving wheels, a plurality of motors mounted above said driving wheels, and two jack shafts disposed adjacent to the driving wheels, of two motor rods disposed in a central vertical plane of the locomotive and adapted to transmit the driving effort of the motors to the jack shafts, and two sets of side rods for connecting the driving wheels to the jack shafts.

4. In a locomotive, the combination with a number of pairs of driving wheels, two jack shafts, and side rods for connecting the driving wheels to the jack shafts, of a plurality of motors, and motor rods for connecting the motors to the jack shafts, said motor rods being disposed in a vertical plane between the driving wheels.

5. In a locomotive, the combination with a plurality of pairs of driving wheels, two jack shafts disposed adjacent to said driving wheels, and side rods for connecting the driving wheels to said jack shafts, of a plurality of motors disposed above said driving wheels, and a plurality of motor rods for transmitting the driving effort of the motors to the jack shafts, said motor rods being disposed in a vertical plane between the driving wheels.

6. In a locomotive, the combination with a plurality of driving wheels, driving motors, and two jack shafts, of two side rods disposed to the side of driving wheels for connecting the latter to the jack shafts, and two motor rods disposed in a central vertical plane between the driving wheel for transmitting the driving effort of the motors to the jack shafts.

7. In a locomotive, the combination with a plurality of pairs of driving wheels, two motors disposed above said driving wheels and provided with tandem mounted armatures, of means comprising two motor rods disposed in a central vertical plane of the locomotive for transmitting the driving effort of the motors to the driving wheels.

8. In a locomotive, the combination with a plurality of pairs of driving wheels, jack shafts disposed adjacent to the driving wheels, and side rods for connecting the driving wheels to the jack shafts, of two motors disposed above the driving wheels and provided with tandem mounted armatures, and two motor rods disposed in a plane between the two motor armatures for transmitting the driving effort of the motors to the jack shafts.

9. In a locomotive, the combination with a plurality of pairs of driving wheels, a jack shaft disposed adjacent to and outside the wheel base of said driving wheels and provided with a crank, and side rods for connecting the driving wheels to said jack shaft, of a motor located above said driving wheels having a shaft provided with a crank, and a motor rod disposed in a plane between the driving wheels for connecting the cranks of the motor and the jack shaft.

10. In a locomotive, the combination with pairs of driving wheels forming a rigid wheel base, jack shafts disposed adjacent to said driving wheels and outside said wheel base, and side rods for connecting the driving wheels to the jack shafts, of two motors having tandem mounted armatures, and motor rods disposed in a plane between the driving wheels for connecting the motors to the jack shafts.

11. In a locomotive, the combination with a pair of driving wheels, two jack shafts disposed adjacent to said driving wheels, and side rods for connecting the driving wheels to said jack shafts, of two motors having tandem mounted armatures, and two motor rods disposed in a plane between the driving wheels for connecting the motors to the jack shafts.

In testimony whereof, I have hereunto subscribed my name this 24th day of Feb. 1917.

GEORGE H. F. HOLY.